(12) United States Patent
Ng

(10) Patent No.: US 12,435,801 B2
(45) Date of Patent: Oct. 7, 2025

(54) SUCTION VALVE AND AN ENDOSCOPE

(71) Applicant: Arctic Ocean Tinore Trade Co., Limited, Hong Kong (CN)

(72) Inventor: Chi Hang Ng, Hong Kong (CN)

(73) Assignee: Arctic Ocean Tinore Trade Co., Limited, Hong Kong (CN)

( * ) Notice: Subject to any disclaimer, the term of this patent is extended or adjusted under 35 U.S.C. 154(b) by 812 days.

(21) Appl. No.: 17/571,635

(22) Filed: Jan. 10, 2022

(65) Prior Publication Data
US 2022/0221069 A1   Jul. 14, 2022

(51) Int. Cl.
*F16K 11/07* (2006.01)
*A61B 1/00* (2006.01)
*A61B 17/00* (2006.01)

(52) U.S. Cl.
CPC ...... *F16K 11/0716* (2013.01); *A61B 1/00068* (2013.01); *A61B 17/00234* (2013.01); *A61B 2017/00296* (2013.01); *A61B 2217/005* (2013.01)

(58) Field of Classification Search
CPC ............ F16K 11/0716; A61B 1/00068; A61B 17/00234; A61B 2017/00296; A61B 2217/005; A61B 1/015; A61B 1/00094
USPC ......................................... 604/119; 600/159
See application file for complete search history.

(56) References Cited

U.S. PATENT DOCUMENTS

| | | | |
|---|---|---|---|
| 5,409,013 A * | 4/1995 | Clement ............. | A61M 39/223 600/566 |
| 12,075,979 B2 * | 9/2024 | Gavalis ............. | A61B 1/00068 |
| 2008/0021274 A1 * | 1/2008 | Bayer ................ | A61B 1/00186 600/117 |
| 2012/0088975 A1 * | 4/2012 | Morimoto .......... | A61B 1/00068 600/159 |
| 2020/0355281 A1 * | 11/2020 | Harris ................. | A61M 39/16 |

FOREIGN PATENT DOCUMENTS

| | | | |
|---|---|---|---|
| CA | 3227205 A1 * | 11/2019 | ........ A61B 1/00018 |
| JP | 2009201563 A * | 9/2009 | ........ A61B 1/00068 |
| JP | 2012071023 A * | 4/2012 | |

* cited by examiner

*Primary Examiner* — Bradley J Osinski
(74) *Attorney, Agent, or Firm* — George G. Wang; Bei & Ocean

(57) ABSTRACT

Disclosed in the present disclosure is a suction valve and an endoscope. The suction valve comprises an outer shell, a shaft, and two or more second sealant rings. The outer shell is hollow, and is provided with a pressing part on the top and a first opening in the side wall. The shaft is embedded into the outer shell, and is connected with the pressing part. The shaft is provided with a second opening at the bottom and a third opening in the side wall respectively, and the second opening is in communication with the third opening. The two or more second sealant rings are each sleeved on the shaft. As the pressing part is pressed, the shaft moves downward, such that the third opening is in communication with the first opening.

19 Claims, 10 Drawing Sheets

SUCTION VALVE AND AN ENDOSCOPE

CROSS-REFERENCE TO RELATED APPLICATIONS

This application claims priority of Hong Kong short-term Application No. 32021023457.3, filed on Jan. 8, 2021, the content of which is hereby incorporated by reference in its entirety.

FIELD OF THE INVENTION

The present disclosure relates to the technical field of medical devices, and in particular to a suction valve and an endoscope.

BACKGROUND

Endoscopes are commonly used in modern medicine as a detection device, which can enter the human body through mouth into stomach or other channels, as well as through surgically formed incisions. By means of an endoscopy, doctors can observe lesions in the body that cannot be shown by X-rays, facilitating subsequent diagnosis of the disease. A gastrointestinal endoscope must be coupled with an appropriate valve assembly, so as to safely, effectively and quickly perform one or more endoscopic medical procedures, including a suction valve to assist in the aspiration of polyps and tissue fluid.

As shown in FIG. 1, the conventional suction valve needs to be sealed by keeping tightness between a seal ring and the inner wall of the endoscope, but as the suction valve is pressed for suction operation, frictions in opposite directions would be generated at the seal ring and the inner wall of the endoscope, leading to the pressing jam and rebound jam, and seriously affecting the staff' operation.

SUMMARY OF THE INVENTION

In a first aspect of the present disclosure, a suction valve is provided, comprising an outer shell, a shaft, and two or more second sealant rings; the outer shell is hollow, and is provided with a pressing part at the top and a first opening in the side wall; the shaft is embedded into the outer shell and is connected to the pressing part; the shaft is provided with a second opening at the bottom and a third opening in the side wall respectively, and the second opening is in communication with the third opening; the two or more second sealant rings are each sleeved on the shaft; as the pressing part is pressed, the shaft moves downward such that the third opening is in communication with the first opening.

In a second aspect of the present disclosure, an endoscope is provided, comprising a first pipe, a second pipe and a suction valve; wherein the suction valve comprises an outer shell, a shaft, and two or more second sealant rings, and wherein the outer shell is hollow, and is provided with a pressing part at the top and a first opening in the side wall; the shaft is embedded into the outer shell and is connected to the pressing part; the shaft is provided with a second opening at the bottom and a third opening in the side wall respectively, and the second opening is in communication with the third opening; the two or more second sealant rings are each sleeved on the shaft; and as the pressing part is pressed, the shaft moves downward such that the third opening is in communication with the first opening; an upper part of the first pipe is provided with a cavity for accommodating the suction valve, an opening of the cavity being communicated with the second opening of the shaft; the first opening of the outer shell is connected to the second pipe.

In a third aspect of the present disclosure, an endoscope is provided, comprising a first pipe, a second pipe and a suction valve, wherein the suction valve comprises an outer shell, a shaft, a first sealant ring, and at least one second sealant rings sleeved outside the shaft, and wherein the outer shell is hollow, and is provided with a pressing part at the top and a first opening in the side wall; the shaft is embedded into the outer shell and is connected to the pressing part; the shaft is provided with a second opening at the bottom and a third opening in the side wall, and the second opening is in communication with the third opening; as the pressing part is pressed, the shaft moves downward such that the third opening is capable of communication with the first opening; the suction valve is accommodated in an upper part of the first pipe, with the second opening of the shaft being communicated with the first pipe; the first opening of the outer shell is connected to and communicated with the second pipe; the first sealant ring is sleeved outside the outer shell, and is compressed between the outer shell and an inner wall of the first pipe.

BRIEF DESCRIPTION OF THE DRAWINGS

In order to more clearly illustrate the technical solutions in the embodiments of the present disclosure, the drawing used for description of these embodiments are briefly described below. It is to be understood that the drawings described below are merely intended to show some exemplary embodiments of the present disclosure, and those skilled in the art can obtain other drawings based on these drawings without creative efforts.

DESCRIPTION OF THE EXEMPLARY EMBODIMENTS OF THE INVENTION

Figure 1:
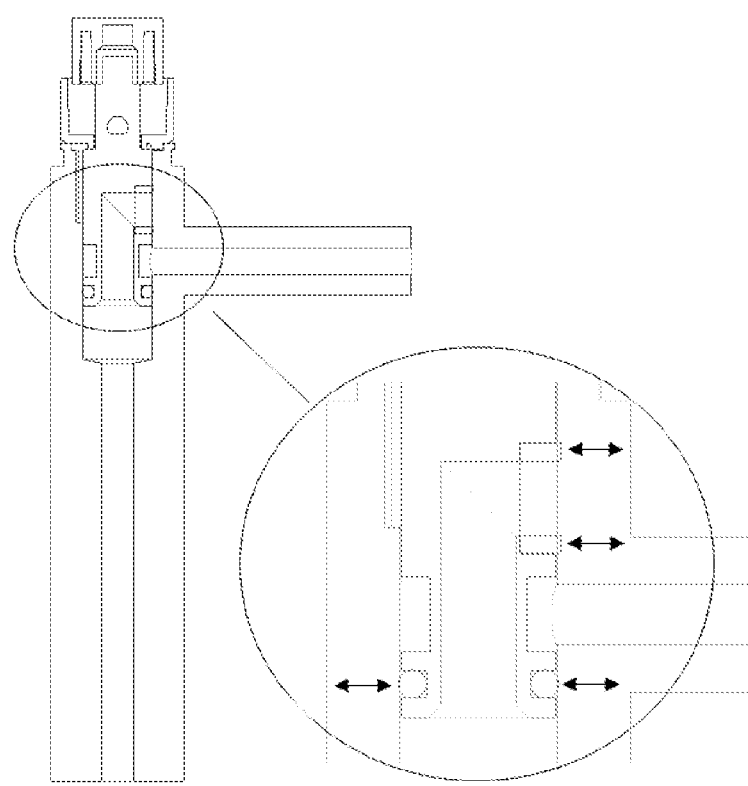
FIG. 1 is a schematic cross-sectional view of a conventional valve.
Figure 2:
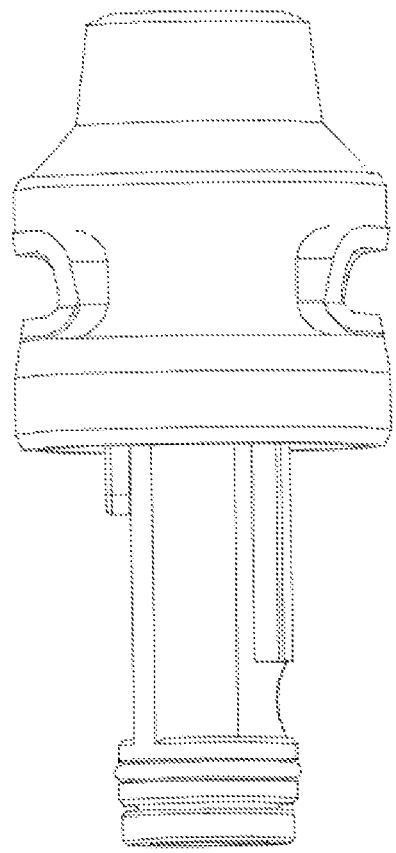
FIG. 2 is a schematic perspective view of a suction valve provided in this disclosure.
Figure 3:
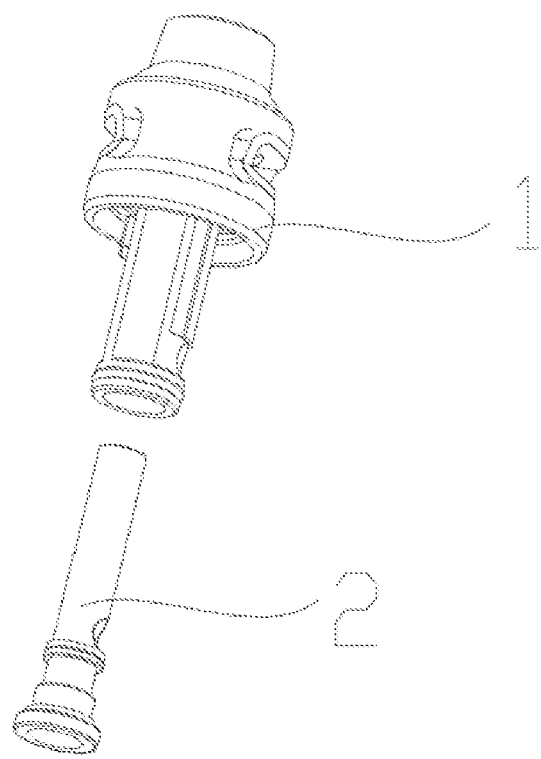
FIG. 3 is a schematic exploded view of a suction valve provided in this disclosure.
Figure 4:
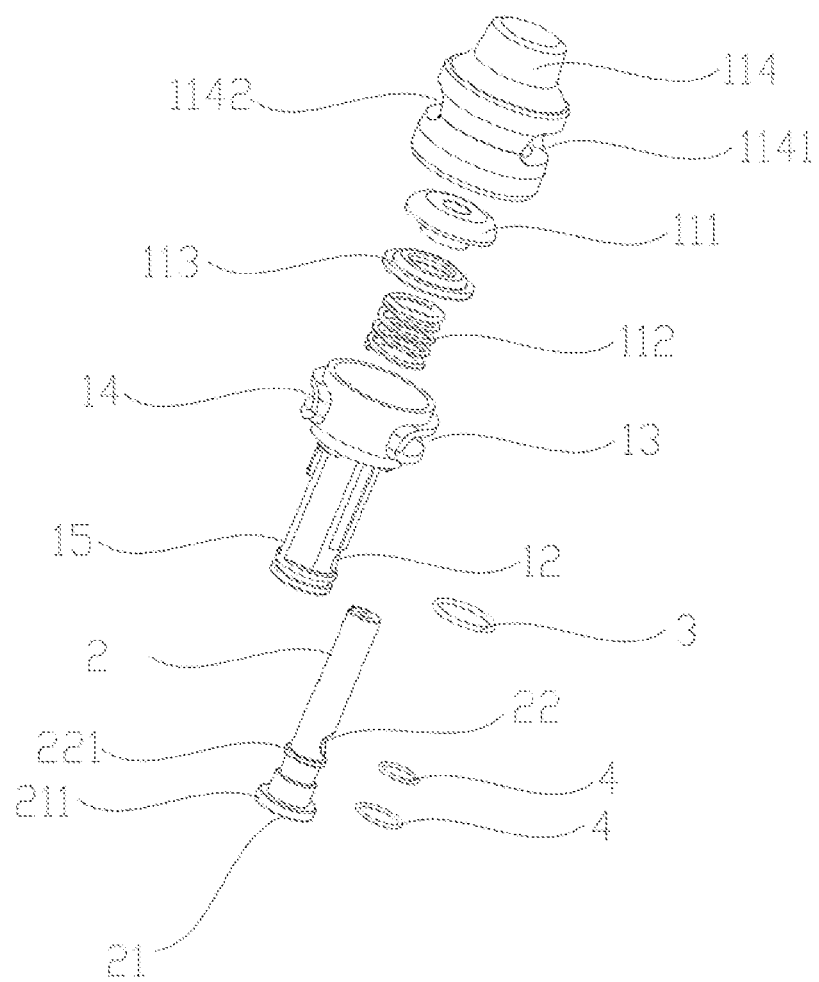
FIG. 4 is another schematic exploded view of a suction valve provided in this disclosure.
Figure 5:
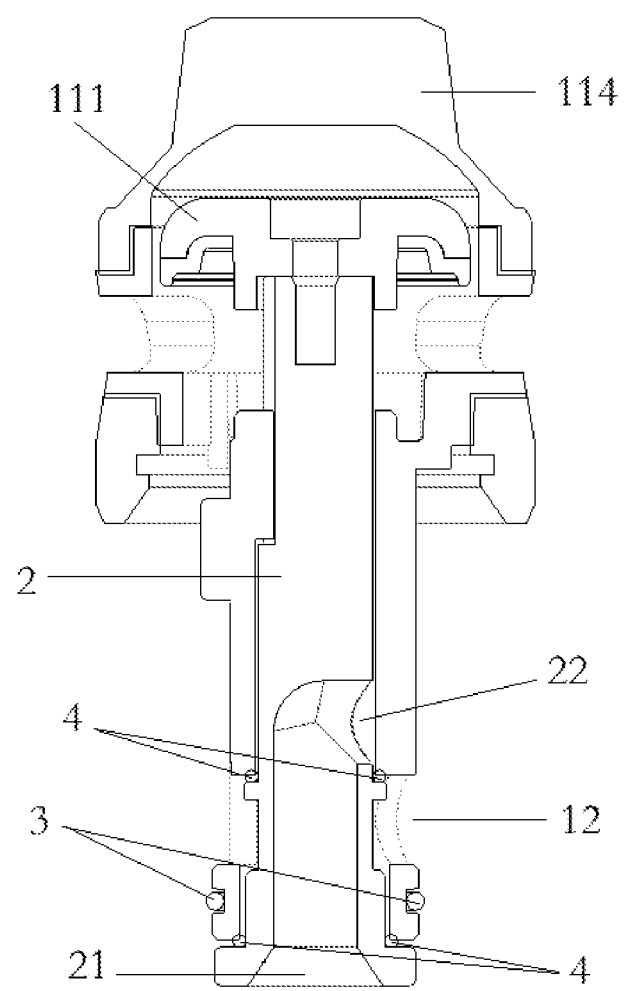
FIG. 5 is a schematic cross-sectional view of a suction valve provided in this disclosure.
Figure 6:
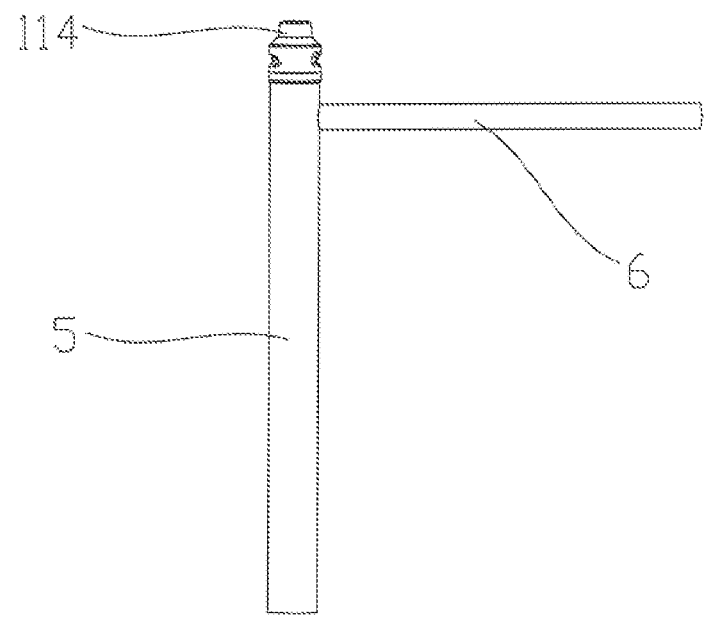
FIG. 6 is a schematic perspective view of an endoscope provided in this disclosure.

As shown in FIG. 1, a partially enlarged part of this figure shows a contact between a sealant ring of a conventional valve and an inner wall of an endoscope, when the conventional valve is pressed. The disadvantages of the conventional valve are analyzed as follows. The conventional valve achieves a sealing effect through a strong pressure type transverse deformation characteristics of the sealant ring and its close contact with the inner wall of the endoscope. However, in order to maintain sealing during suction and to make the valve slide smoothly under pressure, the only way is to strictly control the size of the sealant ring, but it is very difficult to consistently produce sealant rings of a size capable of meeting the sealing performance in large quantities. In case of size variation, the problem of not meeting the sealing requirements would occur, which leads to gas leakage and natural suction. Due to the strong pressure deformation characteristics of the sealant ring and its close contact with the inner wall of the endoscope, a significant friction would be generated between the sealant ring and the inner wall of the endoscope when the conventional valve is pressed, thus forming resistance and making the pressing stuck and unsmooth; staff long-term use will lead to hand fatigue, seriously affecting operation of the staff. Likewise, when the pressing is completed and the valve springs back, a significant friction will also be generated between the sealant ring and the inner wall of the endoscope, making the rebound stuck and unsmooth, causing unpredictable injury to the components being examined. Additionally, in order to avoid jam of the conventional valve, additional lubricant is generally required to provide lubrication to the sealant ring and the inner wall of the endoscope, which may have adverse effects on the human body in addition to cost increase. It is also to be noted that staff usually have to place fingers on the top of a valve cover to be ready for pressing at any time, thus staff shall always control the strength and angle of finger placement. If the staff's fingers inadvertently apply an external force, a misoperation may occur, thus leading to the risk of natural suction.

In light of this, the embodiments in the present disclosure provide a suction valve and an endoscope for solving the technical problem, that the conventional suction valve needs to be sealed by keeping tightness between the sealant ring and the inner wall of the endoscope, but as the suction valve is pressed for suction operation, frictions in opposite directions would be generated at the seal ring and the inner wall of the endoscope, thus resulting in pressing jam as well as rebound jam, which seriously affects the staff's operation.

In order to make the purpose, features and advantages of the present disclosure more obvious and understandable, the technical solutions in the embodiments of this disclosure will be described clearly and completely below, in conjunction with the accompanying drawings in the embodiments of this disclosure. Obviously, the embodiments described in the following are merely a part of the embodiments of this disclosure, but not all of them. All other embodiments, obtained by a person of ordinary skill in the art based on these embodiments in this disclosure without creative efforts, would also fall within the protection scope of this disclosure.

Referring to FIGS. 2 to 10, a suction valve is provided in the embodiments of this disclosure, including an outer shell 1, a shaft 2, a first sealant ring 3, and two or more second sealant rings 4. The outer shell 1 is hollow, and is provided with a pressing part at the top and a first opening 12 in the side wall. The first sealant ring 3 is sleeved outside the bottom of the outer shell 1. The shaft 2 is embedded into the outer shell 1, and is connected to the pressing part. A second opening 21 and a third opening 22 are provided at the bottom and the side wall of the shaft 2, respectively, and the second opening 21 is in communication with the third opening 22. Two or more second sealant rings 4 are all sleeved on the shaft 2. When the pressing part is pressed, the shaft 2 moves downward, such that the third opening 22 is in communication with the first opening 12.

It shall be noted that the suction valve of this embodiment is applied in an endoscope, and may adopt two designs. The first design is through a fixed outer shell 1; a cross-pressure permanent static seal can be obtained through the fixed outer shell 1 and the first sealant ring 3 sleeved on the fixed outer shell 1. When the pressing part is pressed, the shaft 2 moves downward or the shaft 2 rebounds to move upward, while the outer shell 1 remains an unmoved state. Therefore, friction will not be generated at the outer shell 1 and the inner wall of the endoscope, so that the case of pressing jam or rebound jam would not occur. The second design is to sleeve two or more sealant rings on the shaft 2. The shaft 2 is embedded into the outer shell 1, and can move up and down within the outer shell 1. When the pressing part is not pressed, two sealant rings can provide sealing for the outer shell 1 and the shaft 2, so that no natural suction would occur.

The suction valve in this embodiment includes an outer shell 1 and a shaft 2. The outer shell 1 is in contact with the inner wall of the endoscope tube, and the first seal ring can maintain sealing between the outer shell 1 and the inner wall of the endoscope tube. When the pressing part is not pressed, the sealing between the outer shell 1 and the shaft 2 can be maintained through a plurality of second sealant rings 4. When the staff presses the pressing part, the shaft 2 moves downward, while the outer shell 1 in close contact with the inner wall of the endoscope tube remains unmoved, so no upward friction is generated, i.e., the pressing is not jammed. When the pressing is completed and the shaft 2 moves upward, the outer shell 1 in close contact with the inner wall of the endoscope tube still remains unmoved, so no downward friction is generated, i.e., the rebound is not jammed. As a result, the technical problem is solved, that the conventional suction valve needs to be sealed by keeping tightness between the sealant ring and the inner wall of the endoscope, but as the suction valve is pressed for suction operation, frictions in opposite directions would be generated at the seal ring and the inner wall of the endoscope, thus resulting in pressing jam as well as rebound jam, which seriously affects the staff's operation.

The above is a detailed description of the first embodiment provided in this disclosure, and the following is a detailed description of the second embodiment provided in this disclosure.

Referring to FIGS. 2 to 10, a suction valve is provided in this disclosure, including an outer shell 1, a shaft 2, a first sealant ring 3, and two or more second sealant rings 4. The outer shell 1 is hollow, and is provided with a pressing part at the top and a first opening 12 in the side wall. The first sealant ring 3 is sleeved outside the bottom of the outer shell 1. The shaft 2 is embedded into the outer shell 1 and is connected to the pressing part. A second opening 21 and a third opening 22 are provided at the bottom and the side wall of the shaft 2, respectively, and the second opening 21 is in communication with the third opening 22. Two or more second sealant rings 4 are sleeved on the shaft 2. When the pressing part is pressed, the shaft 2 moves downward, so that the third opening 22 is in communication with the first opening 12.

It shall be noted that the suction valve in this embodiment is applied to an endoscope, thus an endoscope is further provided in this embodiment, including a first pipe 5, a second pipe 6 and the suction valve described in the above embodiment. Of course, structural aspects of the endoscope is of related art and will not be repeated here. An upper part of the first pipe 5 is provided with a cavity to accommodate the suction valve, and an opening of the cavity is in communication with the second opening 21 of the shaft 2. The first opening 12 of the outer shell 1 is connected to the second pipe 6. In actual use, the first pipe 5 is inserted into the human body to aspirate polyps and or tissue fluid from the human body, and the second pipe 6 is used to connect the endoscope's pneumatic pump.

Further in this embodiment, a part below the third opening 22 is transversely raised to form a first projection 221; a second projection 211 is transversely raised at the second opening 21; one second sealant ring 4 is set between the first projection 221 and the third opening 22, and another second sealant ring 4 is sleeved above the second projection 211. It shall be noted that when the shaft 2 is incorporated into the outer shell 1, two second sealant rings 4 sleeved on the shaft 2 form two longitudinal compression sealing layers. When the pressing part is not pressed, the first sealant ring 3 on the outer shell 1 forms a transverse compression sealing layer together with the inner wall of the first pipe 5, while two second sealant rings 4 sleeved on the shaft 2 form a longitudinal compression sealing layer, thus making air in the human body impossible to be sucked out. Hence, no natural suction would occur, the degree of sealing is relatively large, the sealing is uniform and controllable, and there is no need to strictly control the size of the rubber ring, which relaxes the requirements for the size of the rubber ring and contributes to production in large quantities.

Further, the pressing part includes a first cap 111 and a spring 112. The spring 112 is sleeved on the shaft 2. One end of the spring 112 is attached within the outer shell 1, and the other end of the spring 112 butts against the first cap 111. When the shaft 2 is pressed through the pressing part, the pressed shaft 2 can spring back due to the elasticity of the spring 112. Additionally, in order to maintain the sealing, a sealing gasket 113 is provided between the first cap 111 and the spring 112 in this embodiment. Since the pressing part is protected by the sealing gasket 113, foreign objects can be prevented from falling directly into the suction valve. In addition, the sealing gasket 113 allows the whole suction valve to be sealed and isolated from the outside environment, maintaining only connections between the suction valve and the first pipe 5, second pipe 6 of the endoscope, so that the suction force provided by a suction device, such as a pneumatic pump, can be effectively utilized to a maximum extent.

Further, the pressing part also includes a second cap 114. The second cap 114 is sleeved on the top of the outer shell 1, and a cushion space is provided between the first cap 111 and the second cap 114. The second cap 114 is made of a soft rubber material, which includes TPE, TPR and TPU, etc., of an elastomer nature. Of course, the second cap 114 in this embodiment can also be made of a silicone material. The first cap 111 in this embodiment is a hard cap. Since the conventional hard cap is directly connected to the valve, once the force is not well controlled, suction is prong to occur under the action of unintentional external force, thus causing damage to the human body. In view of this, the present embodiment provides a second cap 114 made of a soft rubber material; the second cap 114 is a soft cap, and in the second cap 114 and the first cap 111 is directly provided with a cushion space. Even if the staff did not well control the force for a while and pressed the second cap 114, the suction due to by unintentional pressing can be avoided, thus giving the staff a new and comfortable experience.

Further, the top side wall of the outer shell 1 is provided with a plurality of air inlets. The air inlet in this embodiment includes a first air inlet 13 and a second air inlet 14. The first air inlet 13 is located directly above the first opening 12, the second air inlet 14 is set opposite to the first air inlet 13, and the size of the first air inlet 13 is the same as the size of the second air inlet 14.

Figure 9:
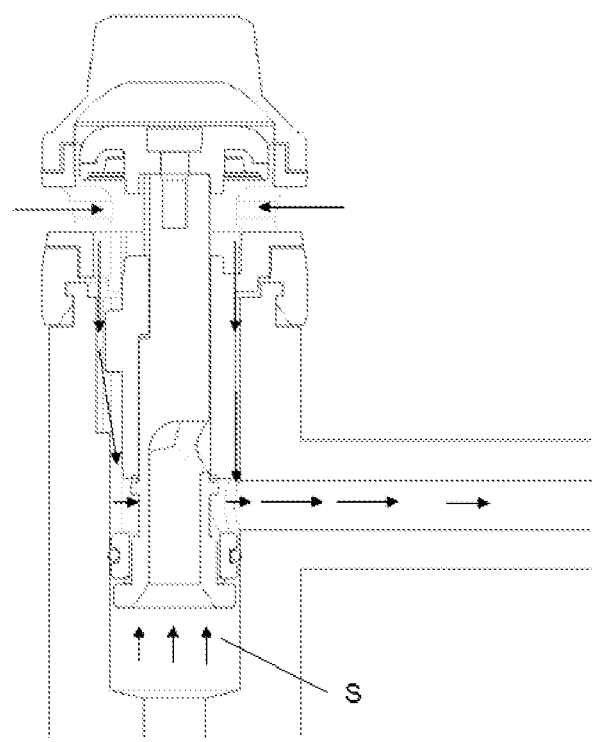
FIG. 9 shows flow direction of gas entering an endoscope provided in this disclosure.

Further, the outer shell 1 is provided with a fourth opening 15 on the opposite side of the first opening 12. Referring to FIG. 9, as the pneumatic pump of the endoscope operates for a long time and the suction valve has isolated gas in the human body, so there is no influence on the air pressure in the body. That is, fluid inside the human body is isolated and held in the space S as shown, and cannot enter the second pipe 6 of the endoscope. An air evacuation channel can be provided through the first air inlet 13, the second air inlet 14 and the fourth opening 15, to allow the peripheral air to enter the pneumatic pump in the endoscope, avoiding an imbalance of air pressure. The gas flow in this embodiment is balanced, and the forces are also balanced under the action of the first sealant ring 3 and the two second sealant rings 4, so there is no risk of sideways or tilting. The conventional valves are unilaterally stressed, which can easily lead to the risk of the valve being tilted or biased in one direction, as shown in FIG. 1.

As an improvement of the second cap 114, the second cap 114 is provided with a first through-hole 1141 adapted to the size of the first air inlet 13, on the side of the first air inlet 13. The second cap 114 is provided with a second through-hole 1142 adapted to the size of the second air inlet 14, on the side of the second air inlet 14. The first through-hole 1141 is snapped with the first air inlet 13, and the second through-hole 1142 is snapped with the second air inlet 14. Since the second cap 114 is snapped with both the first air inlet 13 and the second air inlet 14 of the outer shell 1, the second cap 114 is firmly connected to the outer shell 1 and is not easy to slip off.

Figure 7:
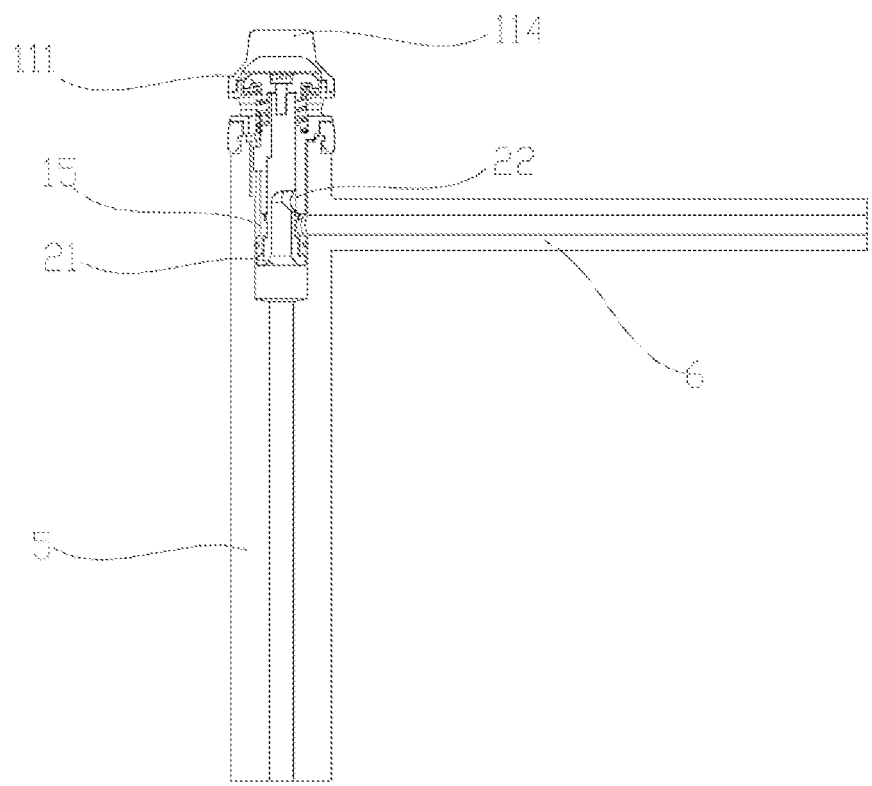
FIG. 7 is a schematic cross-sectional view of an endoscope provided in this disclosure, prior to pressing of the suction valve.
Figure 8:
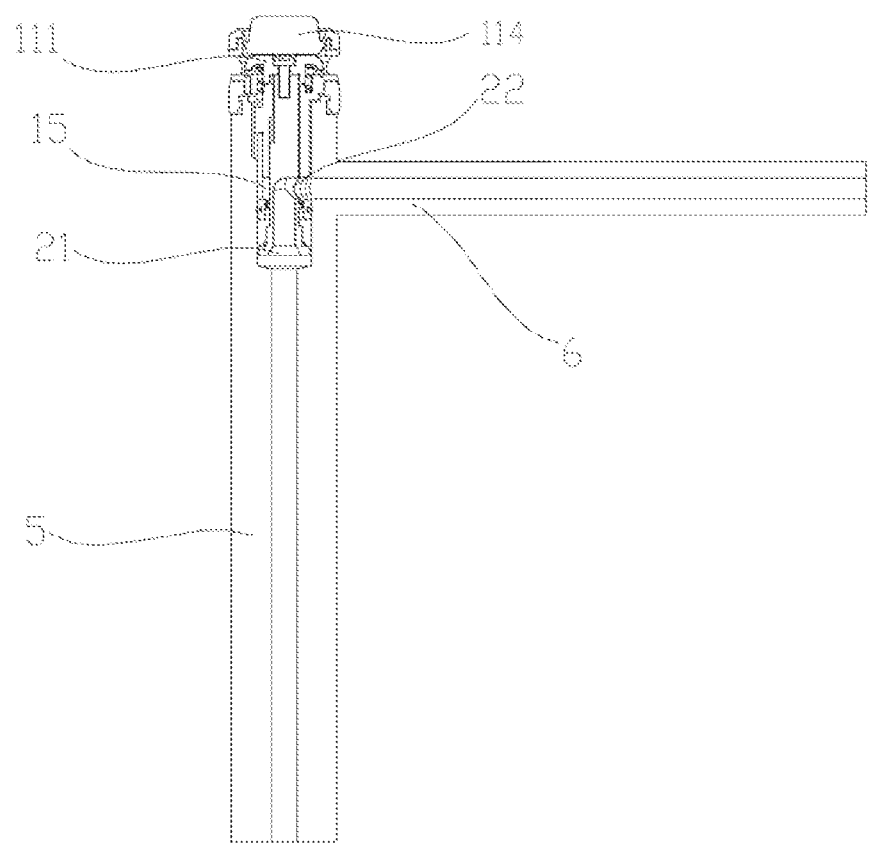
FIG. 8 is a schematic cross-sectional view of an endoscope provided in this disclosure, while the suction valve is pressed and the second cap has been deformed.
Figure 10:
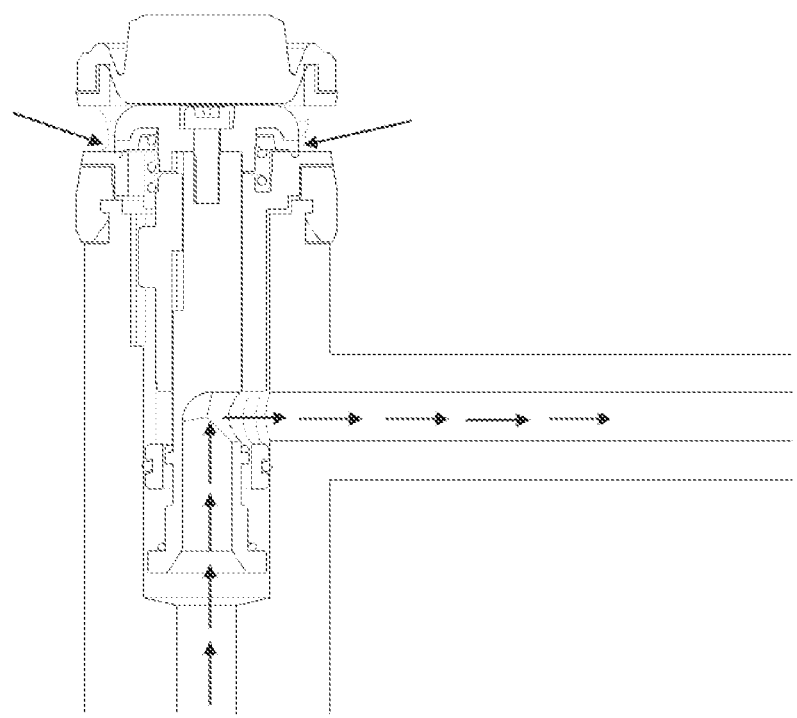
FIG. 10 shows flow direction of gas in an endoscope provided in this disclosure, subsequent to pressing of the suction valve.

When the shaft 2 is incorporated into the outer shell 1, two second sealant rings 4 sleeved on the shaft 2 form two longitudinal compression sealing layers. As illustrated in FIG. 7, when the pressing part is not pressed, a first sealant ring 3 on the outer shell 1 forms a transverse compression sealing layer together with the inner wall of the endoscope, and two second sealant rings 4 sleeved on the shaft 2 form a longitudinal compression sealing layer, thus making it impossible for the air inside the human body to be sucked out. Thus, no natural suction would occur, the degree of sealing is relatively large, and there is no need to strictly control the size of the rubber ring, which relaxes requirements for the size of the rubber ring and contributes to the production in large quantities. As shown in FIG. 8 and FIG. 10, when the pressing part is pressed, the first cap 111 moves downward to be parallel to the air inlet of the outer shell 1. At this time, the outer shell 1 does not move, and the first sealant ring 3 sleeved on the outer shell 1 maintains a static seal. As a result, there is no friction between the first sealant ring 3 and the inner wall of the first pipe 5, so there is no problem of pressing jam. The shaft 2 moves downward, and the third opening 22 is aligned with the first opening 12 of the outer shell 1, so the gas inside the human body can be extracted, achieving the suction. Two second sealant rings 4 sleeved on the shaft 2 are not in contact with the outer shell 1, i.e., there is no sealing. As shown in FIG. 7, when the suction is completed, the shaft 2 springs back, and the first cap 111 and the shaft 2 return to an original state. At this time, the outer shell 1 still does not move, so there will be no friction. The shaft 2 moves upward to make the two second seal rings 4 are both in contact with the outer shell 1, so as to achieve a sealed state again. The gas inside the human body can not be extracted, so that no natural suction would occur.

The outer shell 1 of the suction valve in this embodiment is tightly connected to the first pipe 5, and when the suction valve is pressed, the shaft 2 moves downward while the outer shell 1 does not move downward, thus no upward friction would be generated. When the pressing is completed, the shaft 2 moves upward while the outer shell 1 does not move upward, thus no downward friction would be generated, and there is no pressing jam or rebound jam. Therefore, use of the endoscope in this embodiment does not require additional lubricant, thus solving the existing problem of need for adding lubricant, and also solving the technical problem that the conventional suction valve needs to be sealed by keeping tightness between the sealant ring and the inner wall of the endoscope, but as the suction valve is pressed for suction operation, frictions in opposite directions would be generated at the seal ring and the inner wall of the endoscope, thus resulting in pressing jam as well as rebound jam, which seriously affects the staff's operation.

In description of the embodiments in this disclosure, it is important to note that, terms such as "center", "upper", "lower", "left", "right", "vertical", "horizontal", "inside", "outside", etc., indicate orientation or position relationships based on the accompanying drawings, and are intended only to facilitate and simplify description of the embodiments of the present disclosure, but not to indicate or imply that the device or element referred to must have a particular orientation, be constructed and operate in a particular orientation, and therefore are not to be construed as limiting the embodiments of the present disclosure. Additionally, the terms "first", "second", and "third" are only used for descriptive purposes, but are not to be construed as indicating or implying relative importance.

In description of the present disclosure, it shall be noted that unless expressly specified and limited otherwise, the terms "mount", "connected", "linked" are to be understood in a broad sense, referring to, e.g., a fixed connection, an interchangeable connection or an integral connection, a mechanical connection, an electrical connection, a direct connection, an indirect connection via an intermediate medium, or a communication within two components. For a person of ordinary skill in the art, specific meanings of the aforementioned terms in the context of embodiments of the present disclosure can be understood according to specific cases.

Generally, in an embodiment of the present disclosure, a suction valve is provided, comprising an outer shell, a shaft, and two or more second sealant rings; wherein the outer shell is hollow, and is provided with a pressing part at the top and a first opening in the side wall; the shaft is embedded into the outer shell and is connected to the pressing part; the shaft is provided with a second opening at the bottom and a third opening in the side wall respectively, and the second opening is in communication with the third opening; the two or more second sealant rings are each sleeved on the shaft; as the pressing part is pressed, the shaft moves downward such that the third opening is in communication with the first opening.

Therefore, the sealing between the outer shell and the inner wall of the endoscope tube can be maintained through a first sealant ring, and the sealing between the outer shell and the shaft can be maintained through a plurality of second sealant rings when the pressing part is not pressed. When the staff presses the pressing part, the shaft moves downward, and the outer shell in close contact with the inner wall of the endoscope tube remains unmoved, so no upward friction would be generated, i.e., there would be no pressing jam. When the pressing is completed and the shaft moves upward, the outer shell in close contact with the inner wall of the endoscope tube remains unmoved, so no downward friction would be generated, i.e., there would be no rebound jam, thereby solving the technical problem that the existing suction valve needs to be sealed by keeping tightness between the sealant ring and the inner wall of the endoscope, but as the suction valve is pressed for suction operation, frictions in opposite directions would be generated at the seal ring and the inner wall of the endoscope, thus resulting in pressing jam as well as rebound jam, which seriously affects the staff's operation.

Optionally, a part below the third opening is transversely raised to form a first projection; a second projection is transversely raised at the second opening; one second sealant ring is sleeved between the first projection and the third opening, and another second sealant ring is sleeved above the second projection. Thus, the degree of sealing is relatively large, and the size of the sealant ring does not need to be strictly controlled, thus relaxing the requirements for the size of the sealant ring and contributes to production in large quantities.

Optionally, the pressing part comprises a first cap and a spring; the spring is sleeved on the shaft, with one end of the spring being attached within the outer shell, and the other end of the spring butting against the first cap.

Optionally, a sealing gasket is provided between the first cap and the spring. Thus, foreign objects can be prevented from falling directly into the suction valve.

Optionally, the pressing part further comprises a second cap; the second cap is sleeved on the top of the outer shell, and a cushion space is provided between the first cap and the second cap. Thus, the suction caused by unintentional pressing can be avoided, bringing a new and comfortable experience to the staff.

Optionally, the second cap is made of a soft rubber material.

Optionally, a plurality of air inlets are provided in the top side wall of the outer shell.

Optionally, the air inlets comprises a first air inlet and a second air inlet; the first air inlet is located directly above the first opening; the second air inlet is provided opposite to the first air inlet, thereby maintaining a balance of gas flow.

Optionally, the second cap is provided with a first through-hole adapted to the size of the first air inlet, on the side of the first air inlet; the first through-hole is snapped with the first air inlet.

Optionally, the second cap is provided with a second through-hole adapted to the size of the second air inlet, on the side of the second air inlet; the second through-hole is snapped with the second air inlet, so that the second cap is firmly connected to the outer shell and is not easy to slip off.

Optionally, the first air inlet is of the same size as the second air inlet.

Optionally, the outer shell is provided with a fourth opening on a side opposite to the first opening.

In another embodiment of the present disclosure, an endoscope is provided, comprising a first pipe, a second pipe and a suction valve; wherein the suction valve comprises an outer shell, a shaft, and two or more second sealant rings, and wherein the outer shell is hollow, and is provided with a pressing part at the top and a first opening in the side wall; the shaft is embedded into the outer shell and is connected to the pressing part; the shaft is provided with a second opening at the bottom and a third opening in the side wall respectively, and the second opening is in communication with the third opening; the two or more second sealant rings are each sleeved on the shaft; and as the pressing part is pressed, the shaft moves downward such that the third opening is in communication with the first opening; an upper part of the first pipe is provided with a cavity for accommodating the suction valve, an opening of the cavity being in communication with the second opening of the shaft; the first opening of the outer shell is connected to the second pipe.

Optionally, a first sealant ring is sleeved on the outer shell, and is compressed between the outer shell and an inner wall of the first pipe.

Optionally, the first pipe is inserted into the human body to aspirate polyps and or tissue fluid from the human body, and the second pipe is configured to be connected with a pneumatic pump of the endoscope.

Optionally, the pressing part comprises a first cap, a spring, and a sealing gasket provided between the first cap and the spring; the spring is sleeved on the shaft, with one end of the spring being attached within the outer shell, and the other end of the spring butting against the first cap.

Optionally, the pressing part further comprises a second cap; the second cap is sleeved on the top of the outer shell, and a cushion space is provided between the first cap and the second cap.

Optionally, a first air inlet and a second air inlet are provided in the top side wall of the outer shell; the second air inlet is provided on a side opposite to the first air inlet.

Optionally, the second cap is provided with a first through-hole on the side of the first air inlet, and a second through-hole adapted to the size of the second air inlet; the first through-hole is snapped with the first air inlet; the second through-hole is snapped with the second air inlet.

In a further embodiment of the present disclosure, an endoscope is provided, comprising a first pipe, a second pipe and a suction valve, wherein the suction valve comprises an outer shell, a shaft, a first sealant ring, and at least one second sealant rings sleeved outside the shaft, and wherein the outer shell is hollow, and is provided with a pressing part at the top and a first opening in the side wall; the shaft is embedded into the outer shell and is connected to the pressing part; the shaft is provided with a second opening at the bottom and a third opening in the side wall, and the second opening is in communication with the third opening; as the pressing part is pressed, the shaft moves downward such that the third opening is capable of communication with the first opening; the suction valve is accommodated in an upper part of the first pipe, with the second opening of the shaft being communicated with the first pipe; the first opening of the outer shell is connected to and communicated with the second pipe; the first sealant ring is sleeved outside the outer shell, and is compressed between the outer shell and an inner wall of the first pipe.

In the present disclosure, the outer shell of the suction valve is tightly connected to the first pipe, and when the suction valve is pressed, the shaft moves downward while the outer shell does not move downward, so no upward friction is generated. When the pressing is completed, the shaft moves upward while the outer shell does not move upward, so no downward friction is generated either. As a result, there is no occurrence of pressing jam as well as rebound jam in the disclosed suction valve.

The above embodiments are intended only to illustrate the technical solutions of the present disclosure, but not to limit them. Despite detailed description of this disclosure with reference to the foregoing embodiments, it shall be understood by those of ordinary skill in the art that it is still possible to modify the technical solutions recited in the above embodiments or to make equivalent substitutions for some of the technical features therein. Such modifications or substitutions do not make the corresponding technical solutions deviate from the spirit and scope of respective technical solutions of the respective embodiments in the present disclosure.

What is claimed is:

1. A suction valve, comprising an outer shell, a shaft, and two or more second sealant rings;
   wherein the outer shell is hollow, and is provided with a pressing part at a top of the outer shell and a first opening in a side wall of the outer shell;
   the shaft is embedded into the outer shell and is connected to the pressing part; the shaft is provided with a second opening at the bottom and a third opening in a side wall of the shaft respectively, and the second opening is in communication with the third opening;
   the two or more second sealant rings are each sleeved on the shaft, wherein a part below the third opening is transversely raised to form a first projection, a second projection is transversely raised at the second opening, one of said second sealant rings is sleeved between the first projection and the third opening, and another of said sealant rings is sleeved above the second projection to form two longitudinal compression sealing layers;
   as the pressing part is pressed, the shaft moves downward such that the third opening is in communication with the first opening.

2. The suction valve as claimed in claim 1, wherein the pressing part comprises a first cap and a spring; the spring is sleeved on the shaft, with one end of the spring being attached within the outer shell, and the other end of the spring butting against the first cap.

3. The suction valve as claimed in claim 2, wherein a sealing gasket is provided between the first cap and the spring.

4. The suction valve as claimed in claim 2, wherein the pressing part further comprises a second cap; the second cap is sleeved on the top of the outer shell, and a cushion space is provided between the first cap and the second cap.

5. The suction valve as claimed in claim 4, wherein the second cap is made of a soft rubber material.

6. The suction valve as claimed in claim 4, wherein a plurality of air inlets are provided in a top of the side wall of the outer shell.

7. The suction valve as claimed in claim 6, wherein the air inlets comprises a first air inlet and a second air inlet; the first air inlet is located directly above the first opening; the second air inlet is provided opposite to the first air inlet.

8. The suction valve as claimed in claim 7, wherein the second cap is provided with a first through-hole adapted to the size of the first air inlet, on the side of the first air inlet; the first through-hole is aligned with the first air inlet.

9. The suction valve as claimed in claim 7, wherein the second cap is provided with a second through-hole adapted to the size of the second air inlet, on the side of the second air inlet; the second through-hole is aligned with the second air inlet.

10. The suction valve as claimed in claim 7, wherein the first air inlet is of the same size as the second air inlet.

11. The suction valve as claimed in claim 1, wherein the outer shell is provided with a fourth opening on a side opposite to the first opening.

12. An endoscope, comprising a first pipe, a second pipe and a suction valve;
    wherein the suction valve comprises an outer shell, a shaft, and two or more second sealant rings, and wherein the outer shell is hollow, and is provided with a pressing part at a top of the outer shell and a first opening in a side wall of the outer shell; the shaft is embedded into the outer shell and is connected to the pressing part; the shaft is provided with a second opening at the bottom and a third opening in a side wall of the shaft respectively, and the second opening is in communication with the third opening; the two or more second sealant rings are each sleeved on the shaft, wherein a part below the third opening is transversely raised to form a first projection, a second projection is transversely raised at the second opening, one of said second sealant rings is sleeved between the first projection and the third opening, and another of said second sealant rings is sleeved above the second projection to form two longitudinal compression sealing layers; and as the pressing part is pressed, the shaft moves downward such that the third opening is in communication with the first opening;

an upper part of the first pipe is provided with a cavity for accommodating the suction valve, an opening of the cavity being in communication with the second opening of the shaft;

the first opening of the outer shell is connected to the second pipe.

13. The endoscope as claimed in claim 12, wherein a first sealant ring is sleeved on the outer shell, and is compressed between the outer shell and an inner wall of the first pipe.

14. The endoscope as claimed in claim 12, wherein the first pipe is configured to be inserted into the human body to aspirate polyps and or tissue fluid from the human body, and the second pipe is configured to be connected with a pneumatic pump of the endoscope.

15. The endoscope as claimed in claim 12, wherein the pressing part comprises a first cap, a spring, and a sealing gasket provided between the first cap and the spring; the spring is sleeved on the shaft, with one end of the spring being attached within the outer shell, and the other end of the spring butting against the first cap.

16. The endoscope as claimed in claim 15, wherein the pressing part further comprises a second cap; the second cap is sleeved on the top of the outer shell, and a cushion space is provided between the first cap and the second cap.

17. The endoscope as claimed in claim 12, wherein a first air inlet and a second air inlet are provided in the top a top of the side wall of the outer shell; the second air inlet is provided on a side opposite to the first air inlet.

18. The endoscope as claimed in claim 17, wherein the second cap is provided with a first through-hole on the side of the first air inlet, and a second through-hole adapted to the size of the second air inlet; the first through-hole is aligned with the first air inlet; the second through-hole is aligned with the second air inlet.

19. An endoscope, comprising a first pipe, a second pipe and a suction valve, wherein the suction valve comprises an outer shell, a shaft, a first sealant ring, and at least one second sealant rings sleeved outside the shaft, and wherein the outer shell is hollow, and is provided with a pressing part at a top of the outer shell and a first opening in a side wall of the outer shell; the shaft is embedded into the outer shell and is connected to the pressing part; the shaft is provided with a second opening at the bottom and a third opening in a side wall of the shaft, and the second opening is in communication with the third opening, wherein a part below the third opening is transversely raised to form a first projection, a second projection is transversely raised at the second opening, one of said second sealant rings is sleeved between the first projection and the third opening, and another of said second sealant rings is sleeved above the second projection to form two longitudinal compression sealing layers; as the pressing part is pressed, the shaft moves downward such that the third opening is capable of communication with the first opening;

the suction valve is accommodated in an upper part of the first pipe, with the second opening of the shaft being communicated with the first pipe; the first opening of the outer shell is connected to and communicated with the second pipe;

the first sealant ring is sleeved outside the outer shell, and is compressed between the outer shell and an inner wall of the first pipe.

\* \* \* \* \*